United States Patent [19]

Berkun et al.

[11] Patent Number: 5,210,943
[45] Date of Patent: May 18, 1993

[54] METHOD OF VERIFYING THE CORRECT SEQUENCE OF ASSEMBLY OF A MULTILAYER GASKET

[75] Inventors: Chadd Berkun, Highland Park; Thomas J. Justus, Prospect Heights; Glen Schwerdtfeger, Oswego; David Verson, Highland Park, all of Ill.

[73] Assignee: Fel-Pro Incorporated, Skokie, Ill.

[21] Appl. No.: 776,831

[22] Filed: Oct. 15, 1991

[51] Int. Cl.⁵ .............................................. B21D 53/00
[52] U.S. Cl. ......................................... 29/888.3; 29/407
[58] Field of Search ......................... 29/888.3, 407; 277/235 B; 73/865.8

[56] References Cited

U.S. PATENT DOCUMENTS

| | | | |
|---|---|---|---|
| 4,049,856 | 9/1977 | Adams | 29/888.3 |
| 4,648,607 | 3/1987 | Yamada et al. | |
| 4,810,454 | 3/1989 | Belter | 29/888.3 |
| 4,813,691 | 3/1989 | Schoenborn | |

Primary Examiner—Irene Coda
Attorney, Agent, or Firm—Dressler, Goldsmith, Shore, Sutker & Milnamow

[57] ABSTRACT

A multilayer gasket assembly and a method of making same in a verified correct sequence. Each layer defines sensing formations which sensing formations when stacked over an array of sensors sequentially in a superposed array verify and signify that the layers have been correctly stacked to enable a subsequent operation such as one which secures the layers together.

5 Claims, 2 Drawing Sheets ced in U.S. Pat. No.

METHOD OF VERIFYING THE CORRECT SEQUENCE OF ASSEMBLY OF A MULTILAYER GASKET

TECHNICAL FIELD

This invention generally relates to gasket assemblies and, more particularly, to multilayer gaskets, especially for use with internal combustion engines, and to a process for making such gaskets.

BACKGROUND OF THE INVENTION

Multilayer gaskets such as multilayer metal gaskets are becoming increasingly more popular for use with automobile engines. Such gaskets are typically comprised of two or more layers which are secured to each other, as by clinching tabs or the like. Each gasket layer may be similar in general size and overall configuration to the other layers. Each layer can, however, include details which importantly distinguish it from the other layers, such as by having one or more embossments provided thereon, while another similarly configured gasket layer in the same gasket assembly may have different embossments or other significant features. Additionally, for example, one layer in the assembled, multilayer gasket may be substantially flat while another layer in the same gasket may include embossments, coatings and the like.

Production of multilayer gaskets typically comprises multiple steps. First, because each layer comprising the assembled gasket typically may be uniquely configured, the individual gasket layers are mass produced, as by a stamping or blanking process. The individual gasket layers may also be suitably processed, as by heat treating, with coatings, etc., as may be appropriate. Once completed, the individual gasket layers are assembled in a specific sequence and subsequently are secured in that sequence. After the separate gasket layers have been secured as a complete assembly, the resultant gasket is inspected for accuracy and compliance.

It is critical that each layer comprising the multilayer gasket be assembled in its proper order. Otherwise, the assembled gasket is likely to fail. Because the layers comprising the gasket may all be generally similar in size and overall configuration, assembly of the gasket can easily be done incorrectly. That is, gasket layers may be arranged in an improperly layered order. Alternatively, and because the gasket layers are individually manufactured, stacked, and then assembled, two of the same gasket layers may be inadvertently assembled together. A myriad of other inadvertent and incorrect combinations of gasket layers is conceivable. Such improper combinations or arrangements of the various gasket layers can result in gasket and engine failure.

Various efforts have been made to avoid such problems. One such approach is embodied in U.S. Pat. No. 4,813,691 which is commonly owned with the present application. Another is shown in U.S. Pat. No. 4,648,607.

It would be of advantage to provide a multilayer gasket which has the multiple layers assembled in a verified, proper sequence prior to securing them together to guarantee that the gasket will function correctly and to avoid waste of gasket layers which, if assembled incorrectly, will likely become scrap.

SUMMARY OF THE INVENTION

In accordance with the present invention, a multilayer gasket having at least two different superposed gasket layers secured together in a verified selected sequence is provided. Each gasket layer defines at least one service opening and at least one utility aperture smaller than the service opening. Each gasket layer defines a sensing zone aligned in a superposed array with the sensing zones of the other layers, with each sensing zone defining at least one sensing formation. Each gasket layer has at least one sensing formation which is laterally offset and out of superposed alignment with a sensing formation in each next adjacent superposed gasket layer. In a preferred form the sensing formations are sensing openings defined in the gasket layers. In one form of the invention, the gasket has at least three superposed gasket layers, with each layer having at least two sensing formations in its sensing zone, with at least one sensing formation in each layer being in superposed alignment with a sensing formation in at least one other layer. Desirably the gasket layers are secured together, as with clinching tabs integrally formed with one of the gasket layers.

The method of the present invention comprises the steps of providing at least two different gasket layers, each defining at least one service opening and at least one utility aperture smaller than the service opening, with each gasket layer defining a sensing zone which, when the gasket is assembled, is aligned in a superposed array with the sensing zones of the other gasket layers, with each sensing zone defining at least one sensing formation and each gasket layer having at least one sensing formation which is laterally offset and out of superposed alignment with a sensing formation in each next adjacent superposed gasket layer. The method further includes the step of providing a stacking surface and an array of laterally offset sensors positioned in a location corresponding to the sensing zones of the gasket layers, and the steps of locating a first gasket layer on the stacking surface with its sensing zone in superposed alignment with the sensors and sensing whether its sensing formations correctly correspond to the positions of the sensors, and then stacking each next gasket layer over the first and next preceding gasket layers with its sensing zone in superposed alignment with the sensors, and sensing whether its sensing formations correctly correspond to the positions of the sensors, and providing a signal that the gasket layers having been correctly stacked in the preselected sequence. When the stacking surface is associated with a means for securing the gasket layers together in their preselected sequence, the signal enables the securing means for securing the gasket layers together. Desirably, when at least one of the gasket layers defines clinching tabs, the securing means comprises means for deforming the clinching tabs to secure the stacked layers together.

The manufacturing method of the present invention is very efficient and minimizes human error and labor. It minimizes potential waste by assuring that before securing the layers together, they are assembled in the proper order. It minimizes expense by making it possible to use separately made layers which are then easily and accurately assembled in the proper order.

Other features and advantages of the present invention will become readily apparent from the following detailed description, the appended drawings, and the accompanying claims.

DETAILED DESCRIPTION OF A PRESENTLY PREFERRED EMBODIMENT

Figure 1:
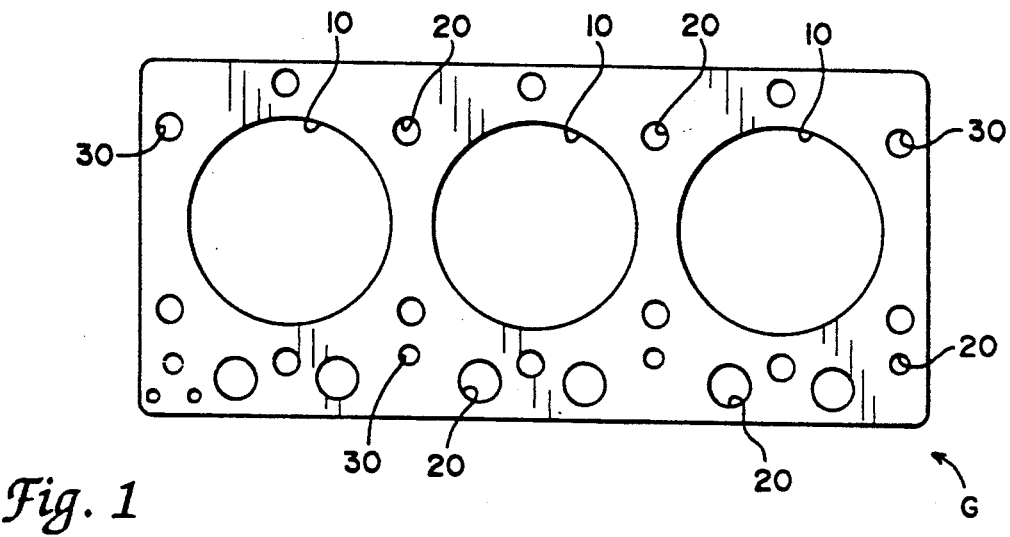
FIG. 1 is a plan view of an assembled gasket made in accordance with the present invention.
Figure 2:
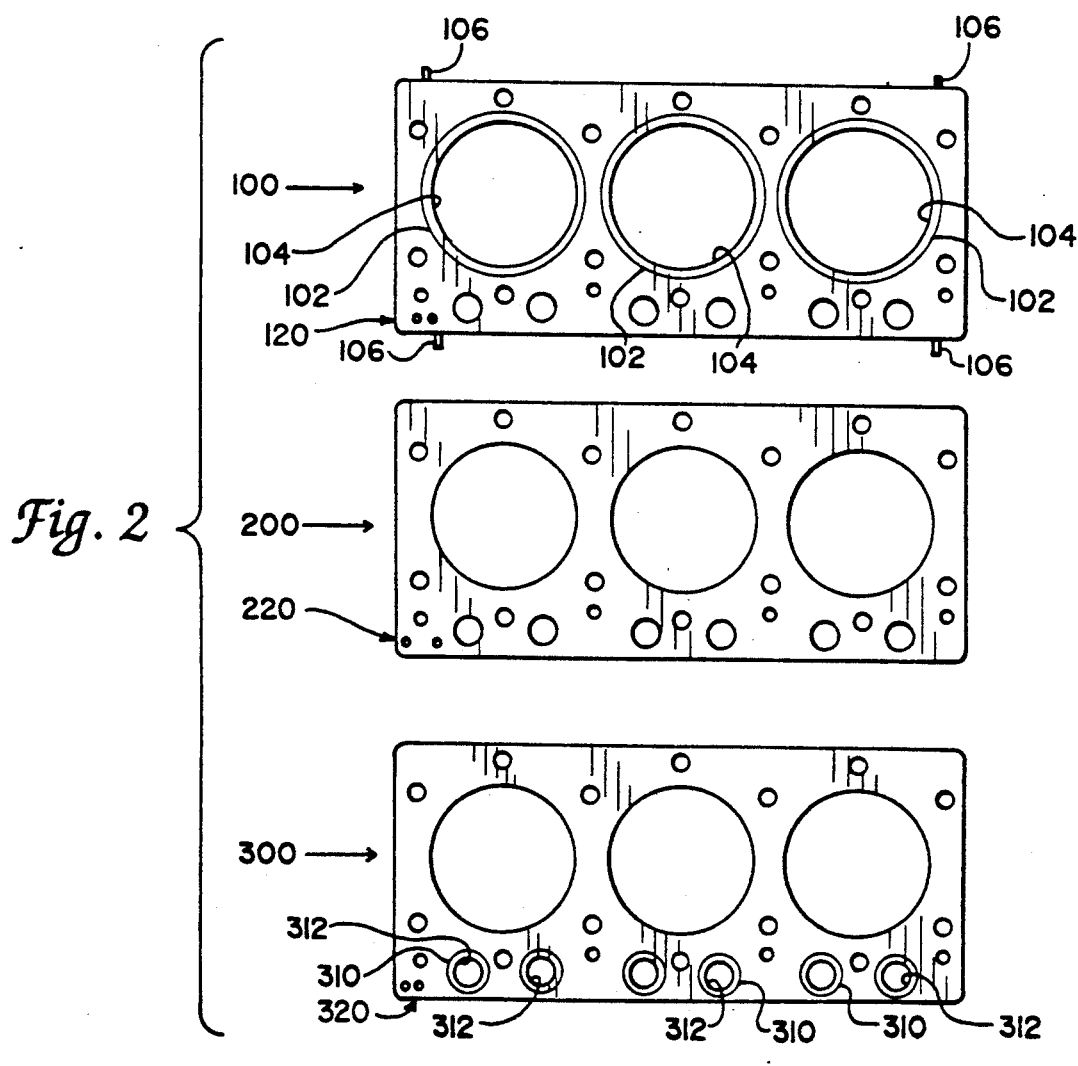
FIG. 2 is an exploded view of the gasket layers of FIG. 1.
Figure 3:
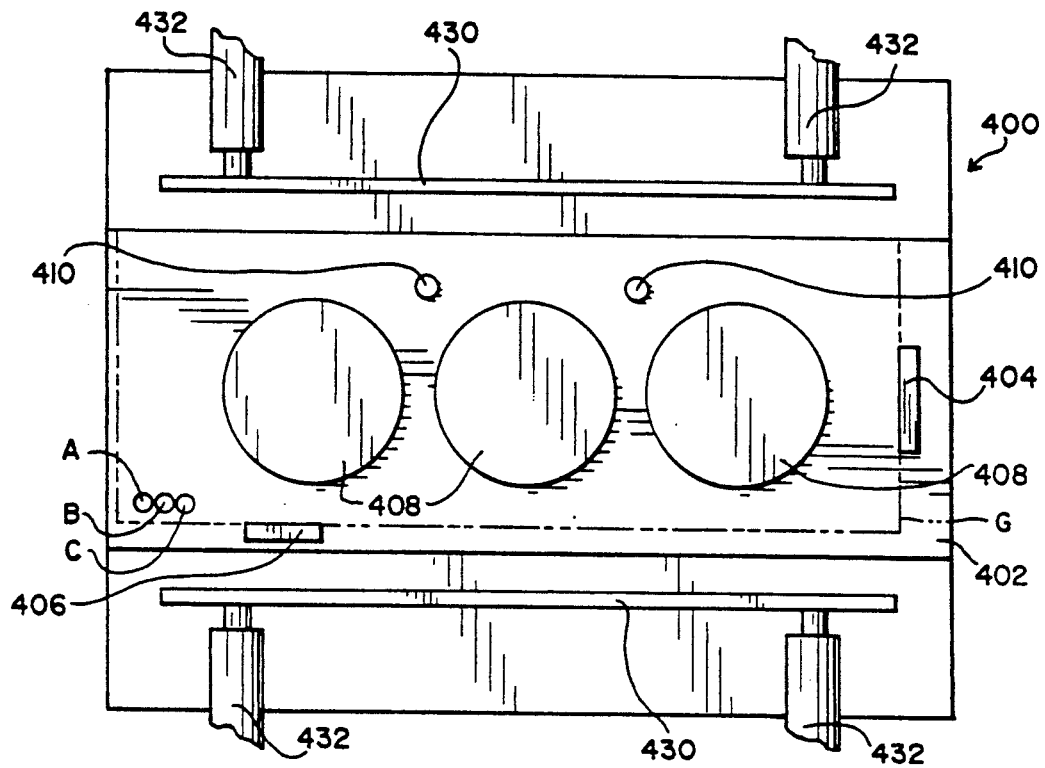
FIG. 3 is a plan view of a clinching fixture for assembling and securing the gasket layers of FIG. 2.
Figure 4:
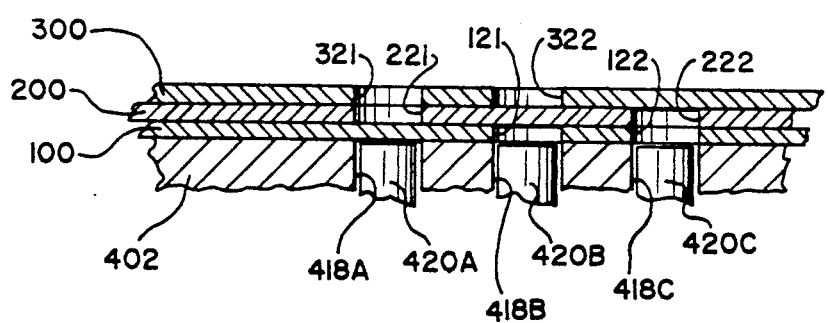
FIG. 4 is a fragmentary schematic view of the clinching fixture of FIG. 3 showing a correctly stacked sequence of gasket layers.
Figure 5:
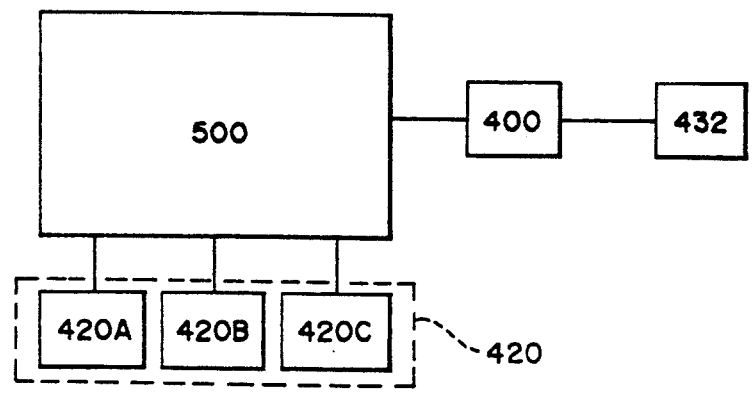
FIG. 5 is a schematic view of a programmed controller and associated sensors and clinching fixture.

While the present invention is susceptible of embodiment in various forms, there is shown in the drawings a presently preferred embodiment hereinafter described, with the understanding that the present disclosure is to be considered as an exemplification of the invention and not as limiting the invention to the specific embodiment illustrated.

Referring now to the drawings, wherein like reference numerals indicate like parts throughout the several views, FIG. 1 illustrates three gasket layers 100, 200 and 300 which are adapted to be assembled in stacked relation, and in a proper preselected order into an assembled gasket G, such as a head gasket for an automotive engine. As shown in FIG. 1, exemplary gasket, such as a head gasket G defines a plurality of service openings such as combustion openings 10, a series of smaller openings or utility apertures, such as apertures 20 for oil and coolant, and a series of bolt holes 30. Each gasket layer may be generally similar in its perimetric configuration. Each is usually different in some regard, such as in the material of construction, in details such as embossments and the like, by coatings applied to certain surfaces, etc. The assembled gasket G has been designed to function with a particular engine, in accordance with considerations which require its assembly in a predetermined sequence and stacked relationship.

Thus for example, one or more layers, such as layer 200, may be stainless steel of a first thickness, and other layers, such as layers 100 and 300 may be rubber coated, as with a microcoating of a type known and used in the art, on their exterior surfaces, and of stainless steel of a somewhat different thickness. Layer 100 may define an inwardly projecting embossment 102 around each combustion opening 104. Layer 200 may be devoid of embossments, whether around the combustion openings or otherwise. Layer 300 may define embossments 310 around coolant apertures 312. Other details adapted for providing an effective gasket G may be used as well.

Of course each layer 100, 200 and 300 of head gasket G defines complementary combustion openings, coolant apertures, oil apertures, bolt holes, etc., all as is known and customary in the gasketing art.

In accordance with the present invention each gasket layer also defines means for sensing the presence of each layer appropriately so that it may be recognized as having been stacked in the proper orientation and sequence. In the embodiment illustrated, the means for sensing proper sequencing comprises a series of formations, such as openings located in a zone of each layer which does not affect sealing, in this case in a corner of each gasket layer 100, 200 and 300. Thus gasket layer 100 defines a sensing zone 120, layer 200 defines a sensing zone 220 and layer 300 defines a sensing zone 320. The sensing zones are aligned in a superposed array. In the three layer example of the preferred embodiment, layer 100 defines a pair of openings 121, 122 located at vertical positions B and C in zone 120, layer 200 defines a pair of openings 221, 222 located at vertical positions A and C in zone 220 and layer 300 defines a pair of openings 321, 322 located at vertical positions A and B in zone 320. At least one sensing opening of a gasket layer is offset laterally and out of superposed alignment with a sensing opening in each next adjacent superposed gasket layer. When the layers are stacked, the respective openings at positions A, B and C, respectively, are vertically aligned so that the sensors of a sensing device will recognize that the layers have been sequentially stacked correctly.

The sequence of stacking or assembly of each gasket layer and its presence is controlled by a suitable programmed logic controller which follows the assembly of the layers via input signals from associated sensors. The controller enables or permits a securing or clinching operation to occur only if all of the individual gasket layers have been stacked in the proper sequence and orientation. The sensing formations or openings in the individual layers correspond to specific sensing devices or sensors of the sensing means and the program resident in the controller. The sensors must provide input signals to the controller in the specific programmed sequence to enable the clinching operation.

The sequence of operation begins when the first, usually the bottom, gasket layer is positioned in an associated clinching fixture. This layer does not have a sensing formation or opening at the corresponding position of a selected sensor for this layer, thereby causing the sensor to register the presence of this layer in the controller as well as the fact that it is the correct layer. If the correct layer is not placed in the fixture in the correct sequence, a sensing opening may be at position A or one or more sensing openings may not be at positions B or C and the layer will not be correctly registered in the controller. The controller will not then enable the clinching operation.

Provided that the first gasket layer is placed correctly, as many subsequent layers as required by the design of the gasket can then be stacked in their proper sequence. This will comprise at least two gasket layers, and usually at least three gasket layers. They will be registered in the controller as programmed, ending with the final proper layer. The controller will then enable the clinching operation which will then be accomplished. The completed gasket is removed from the clinching fixture. Removal will automatically clear and reset the controller memory, readying it for the stacking of the layers of the next gasket to be assembled.

A clinching fixture 400 designed for use in securing assembling the gasket layers 100, 200 and 300 is shown in FIG. 10. It includes a stacking surface or bed 402 on which the gasket layers are adapted to be stacked in sequence. The bed 402 includes positioning blocks 404, 406 and may include locating pads 408 about which the gasket layer combustion openings are positioned, as well as locating pins 410, all of which contribute to the precise positioning of the stacked layers. Desirably pins 410 are off-center longitudinally of the gasket so that they will mate only with right-side up gasket layers. The locating holes in the gasket layers may be existing oil or coolant openings or bolt holes, or special additional holes which will not affect sealing may be provided in the gasket layers if desired. The bed further defines openings 418A, 418B, 418C at selected positions such as at positions A, B and C for the array or plurality of laterally offset sensors 420A, 420B and 420C of a sensing means 420, respectively.

Fixture 400 also includes a pair of spaced tab clinching bars 430 which are reciprocal toward and away from each other, as by pairs of pneumatically operated cylinders 432. These are adapted to force tabs, such as clinching tabs 106 at the periphery of gasket layer 100 (and which are integrally formed therewith) up and over gasket layer 300 to secure and clinch the gasket layers together, thereby to secure the layers in their preselected relationship to each other in the final gasket assembly. Of course, the controller will not permit the clinching to occur unless the programmed stacking of the layers has taken place in proper fashion.

Exemplary of the typical operation of the clinching fixture and associated programmed logic controller 500 may be understood as follows. First, layer 100 is located on the fixture bed 402. It has no opening at position A (which overlies opening 418A and sensor 420A), but has openings at positions B and C. If it is a correct layer and is properly positioned, sensor 420A will recognize the absence of a sensing opening at position A and sensors 420B and 420C will recognize the presence of sensing openings at positions B and C. If it is an incorrect layer, such as a layer 200 or 300, sensor 420A will see an opening at position A. The controller 500 may be programmed to signal if an opening is absent at position A and openings are present at positions B and C. A typical controller 500 may be one available from Allen-Bradley of Milwaukee, Wisconsin, and identified as SLC-150. Typical sensors 420A, 420B and 420C may be clear fiberoptic sensors, such as those available from Keyence Corp. of Torrance, California and identified as LZ-153.

Similarly, when the next layer, layer 200, is stacked over layer 100, sensor 420B will sense the absence of a superposed opening in layer 200, but sensor 420C will recognize the presence of a superposed sensing opening at position C. That will satisfy the controller 500 that layer 200 is proper and in its proper orientation relative to layer 100. Finally, layer 300 is positioned over layer 200 and sensor 420C then senses the absence of a sensing opening at position C therein. At this time, the controller 500 will have both a proper count of the layers, via an included counter, and information establishing that they have been located and stacked properly and in proper sequence. Although, during the stacking, sensors 420B and 420C (for the first layer) and sensor 420C (for the second layer) may have been used to additionally signify that the layers are being stacked correctly, the sensors may be used simply to recognize the absence of an opening in the overlying layer to provide an enabling signal to the controller. In this case, the presence of the locating pins 410 may be used to assure that the layers are being positioned right side up and in their proper orientation.

Once all layers have been recognized as having been correctly stacked, the controller is programmed to enable the clinching operation.

In the preferred embodiment, the sensing formations have been illustrated as being openings positioned in a corner of each gasket layer. It will be apparent that formations in the form of notches at the peripheries of the gasket layers or even tabs projecting from the peripheries may be used in lieu of openings in which event sensors will be suitably used to signify the presence or absence of formations to identify proper sequencing in the stacking of the gasket layers. It will also be apparent that a variety of sensors and controllers may be used.

These are but exemplary of modifications and variations which can be effected without departing from the spirit and scope of the present invention and which will be recognized by those skilled in the art. Accordingly, the invention is not intended to be limited by the embodiments described and illustrated, but is instead to be understood in accordance with the appended claims.

What is claimed is:

1. A method of verifying the correct assembly of a multilayer gasket having at least two superposed gasket layers secured in a preselected sequence comprising the steps of:

providing at least two different gasket layers, each defining at least one service opening and at least one utility aperture smaller than said service opening, with each said gasket layer defining a sensing zone which, when the gasket is assembled, is aligned in a superposed array with the sensing zones of the other gasket layers, each said sensing zone defining at least one sensing formation and each said gasket layer having at least one sensing formation which is laterally offset and out of superposed alignment with a sensing formation in each next adjacent superposed gasket layer, providing a stacking surface and an array of laterally offset sensors positioned in locating corresponding to said sensing zones, locating a first gasket layer on said stacking surface with its sensing zone in superposed alignment with said sensors and automatically sensing whether its sensing formations correctly correspond to a position of at least one sensor, then stacking each next gasket layer over said first and next preceding gasket layers with its sensing zone in superposed alignment with said sensors and automatically sensing whether its sensing formations correctly correspond to a position of at least one sensor, and providing an electrical signal that the gasket layers have been correctly stacked in the preselected sequence.

2. The method of claim 1, and wherein said sensing formations are sensing openings defined in said gasket layers.

3. The method of claim 1, and wherein said stacking surface is associated with a means for securing said gasket layers together in said preselected sequence, and wherein said signal enables said securing means for securing said gasket layers together.

4. The method of claim 3, and wherein said gasket layers are metal and at least one of said gasket layers defines clinching tabs, and said securing means comprise means for deforming said clinching tabs to secure said stacked layers together.

5. A method of verifying the correct assembly of a multilayer assembly having at least two superposed layers secured in a preselected sequence comprising the steps of:

providing at least two different layers, each defining at least one opening, with each said layer defining a sensing zone which, when the layers are assembled, is aligned in a superposed array with the sensing zones of the other layers, each said sensing zone defining at least one sensing formation and each said layer having at least one sensing formation which is laterally offset and out of superposed alignment with a sensing formation in each next adjacent superposed layer, providing a stacking surface and an array of laterally offset sensors positioned in locations corresponding to said sensing zones, locating a first layer on said stacking surface with its sensing zone in superposed alignment with said sensors and automatically sensing whether its sensing formations correctly correspond to a position of at least one sensor, then stacking each next layer over said first and next preceding layers with its sensing zone in superposed alignment with said sensors and automatically sensing whether its sensing formations correctly correspond to a position of at least one sensor, and automatically providing an electrical signal that the layers have been correctly stacked in the preselected sequence.

* * * * *